3,094,430
METHOD OF APPLYING MIRROR COATING TO ACRYLIC BASE
Albion Skwierinski, Caracas, Venezuela, assignor of five percent to John E. Marshall, Jr., Caracas, Venezuela; said Marshall attorney in fact for said Skwierinski, assignor of twenty-five percent to Edwin A. Meyer, twenty-five percent to Dr. Mariano Aveledo, and forty-five percent to Jose Mendez Rincon, Caracas, Venezuela
No Drawing. Filed Dec. 11, 1961, Ser. No. 158,540
6 Claims. (Cl. 117—35)

This invention relates to a method for making a plastic mirror, and more particularly, to a method for applying a silver coating to a surface of a plastic mirror.

Most of the mirrors used today are made of glass. Glass mirrors are preferred because they provide almost total reflection and the reflected images are not distorted. Obviously, glass mirrors are fragile and are easily broken when subjected to severe shock. Attempts have been made to provide unbreakable mirrors. A polished steel plate, for example, may be used as a mirror, but it is expensive to produce and does not reflect as much light as does a glass mirror.

It has been proposed to apply a silver mirror coating on a plastic sheet, but no satisfactory method has been discovered for making the silver adhere to the surface of the plastic. One method of applying a coating to a smooth plastic surface is to etch the surface. This improves the adhesion characteristics of the surface, but it does not form a satisfactory mirror, since the reflecting surface on which the coating is applied must be smooth to produce a clear reflected image.

I have discovered that acrylic plastics are particularly suitable for mirrors since they have the characteristics of high strength, light weight and good transparency. In comparison with glass, acrylic plastics are less than half as heavy, much stronger, and have better optical properties than most glasses. Sheets of acrylic plastic can be cut with ordinary saws and machined with metalworking tools.

Acrylic plastics are thermoplastic and can be readily shaped over a wooden form. Also, the acrylics are resistant to most chemicals, weak alkalies, non-oxidizing acids, oils and solutions of inorganic salts. It is apparent, then, that a mirror made in accordance with this invention is resistant to corrosion and can be easily formed into various shapes.

Acrylic plastic, however, produces static electricity and the surface contains a slightly greasy film which repels the application of silver. An adhesive cannot be applied to the surface, because if it is opaque it will dim the reflection and if it is transparent, it will distort the reflected image.

Accordingly, it is an object of this invention to provide a method for making a mirror which is flexible and unbreakable.

It is a further object of this invention to provide for the practical application of silver to the surface of a plastic to form a mirror.

Acrylic plastics have the characteristics which are desirable in a mirror and the description of this invention will be specifically directed to the application of a mirror surface on acrylic plastic. The method of this invention, however, may be used with other plastics.

The acrylic article, which may be in the form of a sheet or a molded shape, is first cleaned with a commercial polish, until all visible scratches are removed. The polish removes surface impurities which may prevent the adhesion of a smooth film. After the surface has been polished, the acrylic is treated with a tannic acid solution.

After rinsing, the acrylic article is ready to receive the plating solution, which is a mixture of two previously prepared solutions. The first solution preferably contains ammonia, silver nitrate, sodium hydroxide and water. The second solution preferably contains hydrochloric acid, sugar and water. These solutions are mixed together in a container and the contents of the container are poured over the surface of the acrylic plastic until the surface is completely coated with the silver precipitate. Care must be taken not to touch or disturb the coated surface. After the silver has completely covered the surface of the plastic, it is sprayed with a lacquer sealing compound to completely seal the coating from the atmosphere.

The mirror produced in accordance with this invention has a smooth continuous mirror coating which adheres to the surface of the plastic and does not peel off even when the plastic is bent or distorted.

The following is one specific example of the mirror coating method according to this invention:

A. Upon being rubbed, acrylic plastics produce static electricity. Therefore, it is necessary to apply a polish particularly for plastics. One such polish is sold under the trade name "Perspex Polish No. 3 for Acrylic Sheet." The polished surface of the plastic is washed with water sprayed from a pressure hose. The wash water must not contain any chlorine. A tannic acid solution is prepared by dissolving 30 grams of tannic acid in 10 liters of distilled water in an open container. The acrylic article is dipped in the solution and then rinsed lightly with distilled water from a pressure hose. This step may be repeated several times until all the imperfections in the surface of the acrylic article are removed.

B. 120 grams of sodium hydroxide are dissolved in a liter of water. The sodium hydroxide solution is then poured into a container of 16 liters of distilled water. The container which held the sodium hydroxide solution is rinsed with approximately 190 grams of distilled water and the rinsing solution is also added to the 16 liters of distilled water. 400 grams of ammonia in the form of a 25% solution and 100 grams of silver nitrate are mixed in a container.

C. In a separate container, two cc. of hydrochloric acid, 100 grams of sugar and one liter of distilled water are boiled for about ten minutes. This solution is then cooled.

D. The coating solution is formed by mixing together in a large vessel one liter of the solution prepared according to step B, above, and 18 grams of the solution prepared according to step C. The surface of the plastic sheet prepared according to step A above is sprayed with distilled water and the coating solution is poured slowly over the wet surface of the plastic sheet until the surface is completely coated with silver. Care must be taken not to touch the coated surface.

After the coating is formed, the surface is sprayed with a lacquer or paint for mirrors, as is the customary practice in coating mirrors, to form a hard protective coating over the silver. After the lacquer and paint for mirrors is applied, for a better protection over an indefinite period, it is necessary to apply a protective coating of mystified nitrocellulose which has been thinned out with amyl acetate. The lacquer, paint for mirrors, or nitrocellulose are not to be applied with brushes, but must be applied in sufficiently liquid form that they will flow over the surface as it is continuously moved.

A mirror prepared in accordance with this invention produces a reflective image equally as good as that of a glass mirror and yet, is more durable and practical than is a glass mirror. The acrylic plastic mirror of this invention can be bent, nailed through, sawed, or exposed to salt air without damage to the mirror surface. Furthermore, a mirror coating can be applied by the method of this invention to irregular shapes of molded plastic articles.

Although this invention has been described in one embodiment, it is recognized that variations and changes may be made therein without departing from the invention as set forth in the claims.

I claim:

1. A method for applying a mirror coating to an acrylic article comprising treating the article with tannic acid, rinsing the article with water and thereafter applying a mirror coating thereto by precipitation from a silvering solution.

2. A method for forming a mirror on an acrylic article comprising washing the article with a dilute solution of tannic acid, rinsing the article with water, and thereafter applying to the surface of the article a solution of silver nitrate and a reducing solution to precipitate silver on the surface of the plastic article.

3. A method for forming a mirror on an acrylic article comprising treating the surface of the article with a solution of about three grams of tannic acid per liter of water, rinsing the surface of the article with water and thereafter treating the surface of the article with a silvering solution and a reducing solution until a continuous silver film has been deposited on the article.

4. A method for applying a mirror on an article of acrylic plastic comprising treating the surface of the article with a dilute solution of tannic acid, rinsing the surface with water and treating the surface of the article with a silvering solution and a reducing solution to precipitate a silver coating on the surface of the article, said reducing solution containing hydrochloric acid and sugar.

5. A method for forming a mirror on an acrylic article comprising dipping the article in a dilute solution of about three grams of tannic acid per liter of water, rinsing the article, and thereafter treating the article with a silvering solution containing ammonia, silver nitrate, sodium hydroxide and water and a reducing solution containing hydrochloric acid, sugar and water.

6. A method for forming a mirror on an acrylic article comprising dipping the article in a dilute solution of tannic acid, rinsing the article, and thereafter treating the article with a silvering solution and a reducing solution until a continuous silver film has been deposited on the article, said silvering solution comprising in proportion about 120 grams of sodium hydroxide, 400 grams of a 25% solution of ammonia, 100 grams of silver nitrate and about 16 liters of water, and said reducing solution comprising 2 cc. of hydrochloric acid and 100 grams of sugar per liter of water.

References Cited in the file of this patent

UNITED STATES PATENTS

| | | |
|---|---|---|
| 2,273,613 | Bartoe | Feb. 17, 1942 |
| 2,355,933 | Weiss | Aug. 15, 1944 |

OTHER REFERENCES

"Silver Flims," volume 1, Samuel Wein, Dept. of Comm., Office of Technical Services, 1953.